United States Patent
Chai et al.

(10) Patent No.: US 9,066,231 B2
(45) Date of Patent: Jun. 23, 2015

(54) METHOD FOR 802.1X AUTHENTICATION, ACCESS DEVICE AND ACCESS CONTROL DEVICE

(75) Inventors: Yongfu Chai, Beijing (CN); Yonggang Xu, Beijing (CN)

(73) Assignee: HANGZHOU H3C TECHNOLOGIES CO., LTD., Zhejiang (CN)

(\*) Notice: Subject to any disclaimer, the term of this patent is extended or adjusted under 35 U.S.C. 154(b) by 239 days.

(21) Appl. No.: 13/701,491

(22) PCT Filed: Jun. 2, 2011

(86) PCT No.: PCT/CN2011/075203
§ 371 (c)(1),
(2), (4) Date: Nov. 30, 2012

(87) PCT Pub. No.: WO2011/150861
PCT Pub. Date: Dec. 8, 2011

(65) Prior Publication Data
US 2013/0212394 A1 Aug. 15, 2013

(30) Foreign Application Priority Data
Jun. 2, 2010 (CN) .......................... 2010 1 0195759

(51) Int. Cl.
*H04L 29/06* (2006.01)
*H04W 12/06* (2009.01)
*H04W 12/04* (2009.01)
*H04W 84/12* (2009.01)

(52) U.S. Cl.
CPC ........... *H04W 12/06* (2013.01); *H04L 63/0892* (2013.01); *H04W 12/04* (2013.01); *H04W 84/12* (2013.01)

(58) Field of Classification Search
USPC .......... 370/338, 331, 328, 401; 713/171, 168, 713/169
See application file for complete search history.

(56) References Cited

U.S. PATENT DOCUMENTS 7,181,530 B1 2/2007 Halasz et al.
2007/0206492 A1* 9/2007 Zelig et al. ..................... 370/218
(Continued)

FOREIGN PATENT DOCUMENTS

| CN | 1455556 A | 11/2003 |
|----|-----------|---------|
| CN | 1685694 A | 10/2005 |

(Continued)

OTHER PUBLICATIONS

International Search Report and Written Opinion, 12 pages.
(Continued)

*Primary Examiner* — Gilberto Barron, Jr.
*Assistant Examiner* — Simon Kanaan
(74) *Attorney, Agent, or Firm* — Hewlett-Packard Patent Department (57) ABSTRACT

In a method for 802.1X authentication, used in a network which comprises an access device and an access control device, a WLAN security template and a 802.1X client template is enabled at the access device, a 802.1X client template is enabled at the access device, and a 802.1X device template is enabled at a tunnel port of the access control device. The access control device establishes a 802.1X authentication tunnel with the access device, receive a packet transmitted by a client at the access control device through the 802.1X authentication tunnel, authenticates the client after receiving the packet, and assists the access device through the 802.1X authentication tunnel to obtain a session key.

16 Claims, 4 Drawing Sheets

(56) References Cited

U.S. PATENT DOCUMENTS

2007/0226499 A1    9/2007  Zhang
2009/0150665 A1*   6/2009  Kaippallimalil et al.  ..... 713/153

FOREIGN PATENT DOCUMENTS

| CN | 1859085    | 11/2006 |
| CN | 1964576    | 5/2007  |
| CN | 1976309    | 6/2007  |
| CN | 101583144 A | 11/2009 |

OTHER PUBLICATIONS

CN First Office Action dated Jul. 25, 2013 issued on CN Patent Application No. 201010195759.1 dated Jun. 2, 2010, The State Intellectual Property Office, P.R. China.

* cited by examiner

METHOD FOR 802.1X AUTHENTICATION, ACCESS DEVICE AND ACCESS CONTROL DEVICE

The present application is a 371 application of International Application No. PCT/CN2011/075203 filed on Jun. 2, 2011 and entitled "Method for 802.1X Authentication, Access Device and Access Control Devices," which claims the benefit of Chinese Patent Application No. 201010195759.1 filed on Jun. 2, 2010.

BACKGROUND

The IEEE 802.1X protocol is an access control mechanism for a LAN port, which is widely used in Ethernet. The protocol provides an authentication method and a security function within the Ethernet.

The 802.1X protocol is a port-based network access control protocol. "port-based network access control" means that authentication of a user device and access to a LAN by the user device is controlled at a port of a LAN access device. If a user device connected to the port passes the authentication, then it can visit resources in the LAN. If user device connected to the port does not pass the authentication, then it can not visit the resources in the LAN.

DETAILED DESCRIPTION

A 802.1X system typically has a client/server structure, and a client can visit a server after passing authentication by an authenticator. The authenticator usually resides in a network device, and the network device generally supports the 802.1X protocol. Generally, the network device where the authenticator resides and the client are connected with each other in a point-to-point mode and are located in the same Wireless Local Area Network (WLAN) section. The network device where the authenticator is located provides a port for the client to access the LAN and authenticates the client according to MILAN authentication architecture. However, in some networking circumstances, the network device where the authenticator resides is not directly connected to the client and deviates from the WLAN section where the client is located. In this case, the authenticator can only perform wired authentication for the client and can not combine the MILAN security architecture. As a result, wireless packets between the authenticator and the client are transmitted as plaintext, which does not accord with the security framework for wireless user authentication because the security framework for wireless user authentication generally requires encrypted data transmission.

Figure 1:
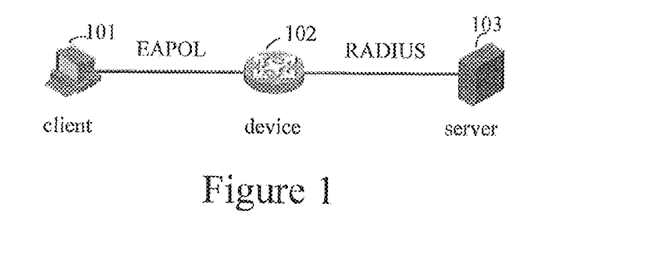
FIG. 1 is a structure diagram of a 802.1X system.

FIG. 1 is a structure diagram of a 802.1X system. As shown in FIG. 1, the 802.1X system comprises three entities: a client 101, a device 102 and a server 103.

The client 101 is an entity at one side of a LAN segment, and is authenticated by an entity at the other side of a link. The client 101 is generally a user terminal device, and a user can initiate 802.1X authentication through starting client software. The client 101 should support Extensible Authentication Protocol over LAN (EAPOL).

The device 102 is an entity at the other side of the LAN segment, includes an authenticator and authenticates the client 101 connected to it. The device 102 is usually a network device supporting the 802.1X protocol and provides a port for the client 101 to access the LAN. The port may be a physical port or a logical port.

The server 103 is an entity providing authentication services for the device 102. The server 103 is configured to implement Authentication, Authorization and Account for the user, and may for example be a Remote Authentication Dial-In User Service (RADIUS) server.

In general application circumstance, the client 101 and the device 102 should be connected directly. However, in some networking circumstance, the client 101 may not be directly connected with the device 102. For example, refer to FIG. 2, an Access Point (AP) is directly connected with the client via a physical MILAN connection, while in the 802.1X system, an Access Controller (AC) is the device 102 which is logically connected with the client 101 directly and the authenticator may reside in the AC. However, alternatively authentication and access of the user may be managed by a Broadband Remote Access Server (BRAS), i.e. the authenticator may reside in the BRAS. In this case, the 802.1X authentication process between the client 101 and the BRAS will be performed via the AC.

Figure 2:
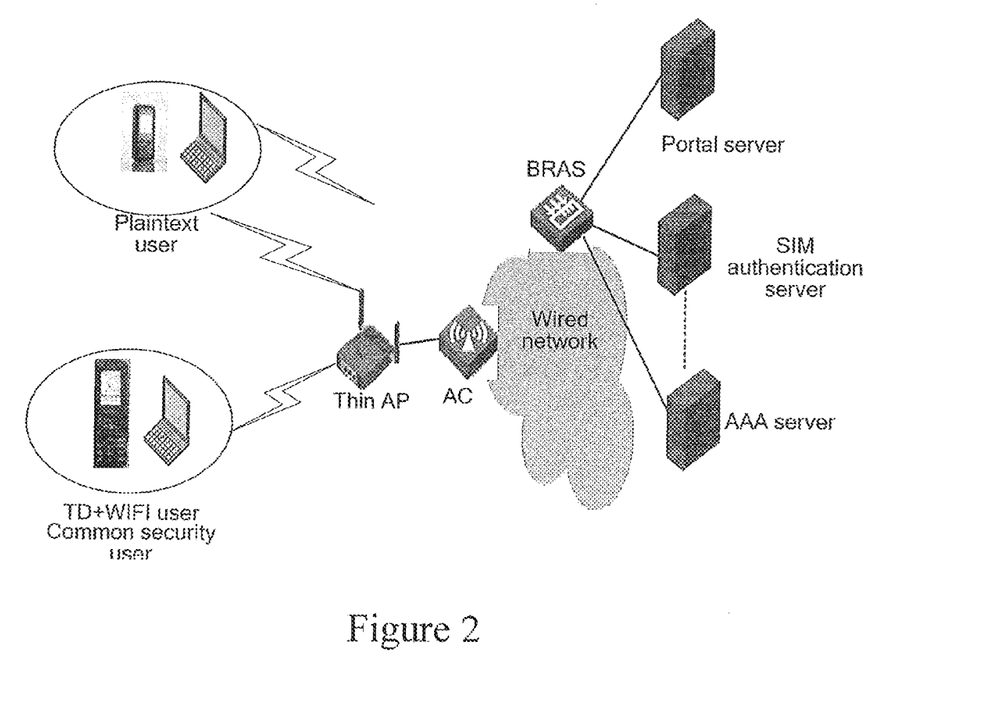
FIG. 2 is a network architecture diagram for a network employing 802.1X authentication.

When the 802.1X authentication process for the user is performed via the AC, possible solutions include the following:

Solution one, the AC directly uses layer-2 networking and enables the 802.1X authentication at a gateway port of the BRAS. As shown in FIG. 2, after receiving a 802.1X authentication protocol packet transmitted by the client 101, the AC forwards the 802.1X authentication protocol packet according to a layer-2 MAC forwarding table, and the BRAS authenticates the user after receiving the 802.1X authentication protocol packet.

Solution 2, the AC uses 802.1X relaying technique and enables the 802.1X authentication at the gateway port of the BRAS. As shown in FIG. 2, after receiving a packet transmitted by the client 101, the AC parses the packet, and forwards the packet to the BRAS for authentication if the packet is the 802.1X authentication protocol packet.

Solution 3, the AC uses a 802.1X sensing technique and enables the 802.1X authentication at the gateway port of the BRAS. As shown in FIG. 2, the AC senses a packet passing through the AC, allows the packet to pass if the packet is the 802.1X authentication protocol packet, and allows data packets to pass only when sensing a 802.1X authentication protocol packet indicating authentication pass.

In the above three solutions, the authenticator resides in the BRAS and is not part of the WLAN architecture. In this case, the authenticator can only perform wired authentication for a user, and can not use the WLAN security architecture, i.e. it can not support the WLAN security architecture. As a result, the AC can not activate WLAN security configurations; wireless packets between the AC and the BRAS can only be transmitted as plaintext, which does not accord with the security framework for wireless user authentication because security framework for the wireless user authentication generally requires encrypted data transmission. The cause of this problem is that: the AC and the BRAS only support layer-2 packet transmission between them in the above three solutions, while a layer-2 protocol between the BRAS and the AC does not support key transmission, and thereby the BRAS can not issue key information to the AC and the layer-2 protocol thus can not perform key negotiation.

In view of the above, another example provides a method for 802.1X authentication, used in a network which comprises an access device and an access control device, wherein a Wireless Local Area Network (WLAN) security template is enabled at the access device, a 802.1X client template is enabled at the access device, and a 802.1X device template is enabled at a tunnel port of the access control device, the method comprising:

establishing, by the access control device, a 802.1X authentication tunnel with the access device;

receiving a packet transmitted by a client at the access control device through the 802.1X authentication tunnel;

authenticating, by the access control device, the client after receiving the packet;

assisting, by the access control device, the access device through the 802.1X authentication tunnel to obtain a session key.

Another example provides a method for 802.1X authentication, used in a network which comprises an access device and an access control device, wherein a Wireless Local Area Network (WLAN) security template is enabled at the access device, a 802.1X client template is enabled at the access device, and a 802.1X device template is enabled at a tunnel port of the access control device; the method comprising:

establishing, by the access device, a 802.1X authentication tunnel with the access control device;

receiving a packet transmitted by a client at the access device, and transmitting the packet to the access control device through the 802.1X authentication tunnel, whereby the access control device can authenticate the client according to the packet received from the access device;

obtaining, by the access device, a session key under an assist of the access control device through the 802.1X authentication tunnel.

Another example provides a method for 802.1X authentication, an access device and an access control device. The access device refers to a device for connecting a client to a network, which may for example be the AC or FAT AP. The access control device is a network entity in which the authenticator is located, and which is configured to authenticate the client. In this example, a WLAN security template is enabled at the access device, a 802.1X authentication tunnel is set up between the access device and the access control device, a 802.1X client template is enabled at the access device, and a 802.1X device template, i.e. authenticator and authentication-related parameters, is enabled at a tunnel port of the access control device. The method comprises: the access device receiving a packet transmitted by the client, and transmiting the packet to the access control device through the 802.1X authentication tunnel if the packet is a 802.1X protocol packet; upon receiving the 802.1X protocol packet, the access control device authenticates the client; after the client passes the authentication, the access control device issues a pairwise master key obtained during an authentication process to the access device through the 802.1X authentication tunnel, so that the access device performs key negotiation with the client by using the pairwise master key; or, the access control device directly performs key negotiation with the client via the access device through the 802.1X authentication tunnel by using the pairwise master key obtained during the authentication process, and issues a session key obtained by negotiation to the access device through the 802.1X authentication tunnel.

Figure 3:
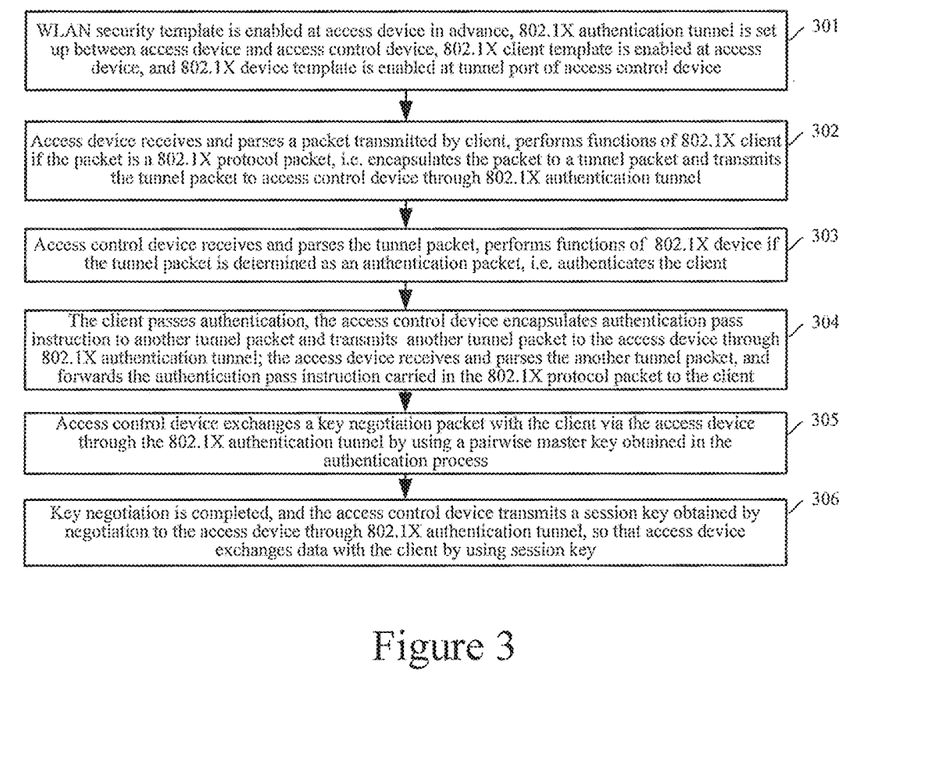
FIG. 3 is a flowchart of a method for 802.1X authentication according to an example.

FIG. 3 is a flowchart of a method for 802.1X authentication according to this example. As shown in FIG. 3, the method comprises the following:

Step 301: A WLAN security template is enabled at the access device in advance, a 802.1X authentication tunnel is set up between the access device and the access control device, a 802.1X client template is enabled at the access device, and a 802.1X device template is enabled at a tunnel port of the access control device.

In one example, the access device may be the AC or the FAT AP, and the access control device may be a Broadband Access Server (BAS) or a BRAS.

The 802.1X authentication tunnel may be a Light Weight Access Point (LWAP) tunnel.

A template herein refers to related configurations, and enabling the template means applying the related configurations of the template. For example, WLAN security parameters are configured in the WLAN security template, and enabling the WLAN security template means applying the WLAN security parameters. Enabling the 802.1X client template at the access device means setting related configurations of a 802.1X client at the access device, so that the access device can perform functions of the 802.1X client during the 802.1X authentication process. Similarly, enabling the 802.1X device template at the tunnel port of the access control device means setting related configurations of a 802.1X device at the tunnel port of the access control device, e.g. setting configurations of a 802.1X authenticator so that the access control device can perform functions of the 802.1X device during the 802.1X authentication process. This enables the access control device to block a user before the user is authenticated, but allows the user to visit the network after the user has been authenticated the user. In one example the configurations of the 802.1X authenticator comprise any, or all of, the packet transmission period, the number of retransmission times and an authentication mode (password card or password).

Step 302: The access device receives and parses a packet transmitted by the client. The access device performs the functions of the 802.1X client if the packet is a 802.1X protocol packet, i.e. encapsulates the packet to a tunnel packet and transmits the tunnel packet to the access control device through the 802.1X authentication tunnel.

Step 303: The access control device receives and parses the tunnel packet. The access control device performs the functions of the 802.1X device if the tunnel packet is determined as an authentication packet, i.e. authenticates the client.

Step 304: When the client passes the authentication, the access control device encapsulates an authentication pass instruction to another tunnel packet and transmits the another tunnel packet to the access device through the 802.1X authentication tunnel. The access device receives and parses the another tunnel packet, and forwards the authentication pass instruction carried in a 802.1X protocol packet to the client.

Step 305: The access control device exchanges a key negotiation packet with the client via the access device through the 802.1X authentication tunnel by using a pairwise master key obtained in the authentication process.

The key negotiation process is as follows:

When receiving a packet transmitted by the access control device through the 802.1X authentication tunnel, the access device parses the packet, forwards the packet to the client if the packet is determined as the key negotiation packet; when receiving a packet transmitted by the client, the access device parses the packet, encapsulates the packet to a tunnel packet if the packet is determined as the key negotiation packet and transmits the tunnel packet to the access control device through the 802.1X authentication tunnel.

Step 306: The key negotiation is completed, and the access control device transmits a session key obtained by negotiation to the access device through the 802.1X authentication tunnel, so that the access device exchanges data with the client by using the session key.

Figure 4:
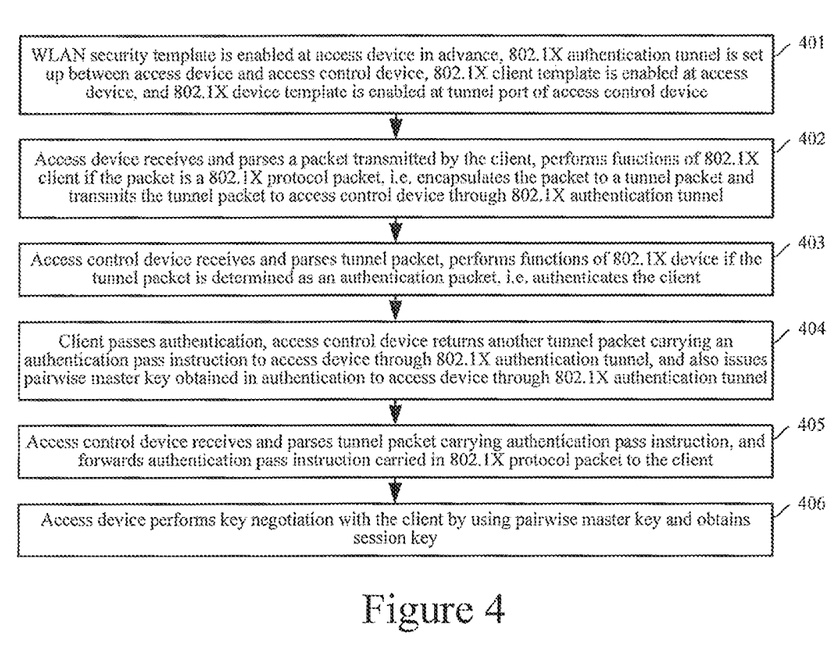
FIG. 4 is a flowchart of a method for 802.1X authentication according to another example.

FIG. 4 is a flowchart of a method for 802.1X authentication according to an example. As shown in FIG. 4, the method includes the steps of:

Step 401: A WLAN security template is enabled at the access device in advance, a 802.1X authentication tunnel is set up between the access device and the access control device, a 802.1X client template is enabled at the access device, and a 802.1X device template is enabled at a tunnel port of the access control device.

In an example of the present invention, the access device may be the AC or FAT AP, and the access control device may be a Broadband Access Server (BAS) or a BRAS.

Step 402: The access device receives and parses a packet transmitted by the client. The access device performs the functions of the 802.1X client if the packet is a 802.1X protocol packet, i.e. encapsulates the packet to a tunnel packet and transmits the tunnel packet to the access control device through the 802.1X authentication tunnel.

Step 403: The access control device receives and parses the tunnel packet. The access control device performs the functions of the 802.1X device if the tunnel packet is determined as an authentication packet, i.e. authenticates the client.

Step 404: When the client passes the authentication, the access control device returns another tunnel packet carrying an authentication pass instruction to the access device through the 802.1X authentication tunnel, and also issues a pairwise master key obtained in the authentication process to the access device through the 802.1X authentication tunnel.

Step 405: The access control device receives and parses the tunnel packet carrying the authentication pass instruction, and forwards the authentication pass instruction carried in a 802.1X protocol packet to the client.

Step 406: The access device performs key negotiation with the client by using the pairwise master key and thus obtains a session key.

In an example, when layer-2 networking is configured between the access device and the access control device, a packet transmitted in the 802.1X authentication tunnel uses a layer-2 encapsulation format; when layer-3 networking is configured between the access device and the access control device, a packet transmitted in the 802.1X authentication tunnel uses a layer-3 encapsulation format.

In FIGS. 3 and 4, the 802.1X authentication tunnel is set up in advance, and had better be set up when the access device enables a WLAN access function at the initial stage of network deployment in practice. Alternatively, the 802.1X authentication tunnel may be set up when the access device receives the 802.1X protocol packet transmitted by the client for the first time in Step 302 or 402. If the 802.1X authentication tunnel need not be used again, it may be released.

When the network includes multiple access control devices, respective 802.1X authentication tunnels may be set up between the access device and the multiple access control devices so as to implement tunnel backup. A main access control device being used by a main 802.1X authentication tunnel synchronizes information exchanged with the access device to another access control devices in real time, so that the other access control devices can replace the main access control device to interact with the access device in the case that the main access control device is in failure.

In the above examples, the client is a wireless client. However, the authentication process in the above examples may also be applicable to a wired client, in which case the method differs in that steps 305 and 306 of FIG. 3 or step 406 in FIG. 4 need not be performed because the wired client requires no key negotiation.

Machine readable instructions enabling a machine to execute the method for 802.1X authentication in the above examples may be stored on a machine readable storage medium. Specifically, a system or apparatus configured with a storage medium may be provided, the storage medium stores software program codes for realizing functions of any of the above examples and enables a processor (or CPU or MPU) of a computer or similar apparatus to read and execute software program codes stored in the storage medium.

The storage medium storing the program codes in an example of the present invention includes a floppy disk, a hard disk, a magnetic disk, a CD (such as CD-ROM, CD-R, CD-RW, DVD-ROM, DVD-RAM, DVD-RW and DVD+RW), a magnetic tape, a non-volatile memory card and a Read-Only Memory (ROM). Alternatively, the program codes may be downloaded from a server computer over a communication network.

In addition, it should be noted that part or all of practical operations may be implemented through executing the program codes read by the computer, or may be implemented through an operation system of the computer enabled by instructions based on the program codes, and thereby the functions of any of the above examples can be implemented.

Furthermore, it can be understood that the program codes read from the storage medium may be written into a storage configured in an expansion board inserted into the computer or be written into a storage configured in an expansion unit connected to the computer, and then instructions based on the program codes enable a CPU installed in the expansion board or the expansion unit to execute part or all of practical operations, and thereby the functions of any of the above examples can be implemented.

Figure 5:
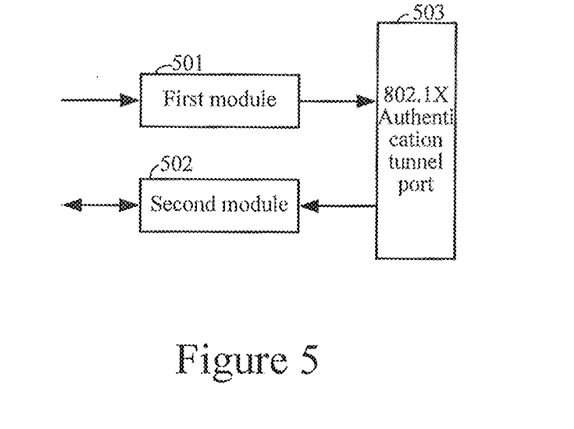
FIG. 5 is a structure diagram of an access device according to one example.

FIG. 5 is a structure diagram of an access device according to an example. The access device shown in FIG. 5 has a WLAN security template. A 802.1X authentication tunnel is set up between the access device and the access control device, a 802.1X client template is enabled at the access device, and a 802.1X device template is enabled at a tunnel port of the access control device. The access device includes a first module 501, a second module 502 and a 802.1X authentication tunnel port 503.

The first module 501 receives a packet transmitted by the client, and performs functions of a 802.1X client if the packet is determined as a 802.1X protocol packet, i.e. encapsulates the packet to a tunnel packet and transmits the tunnel packet to the access control device via the 802.1X authentication tunnel port 503 through the 802.1X authentication tunnel, so that the access control device authenticates the client according to the packet.

The second module 502 receives a pairwise master key transmitted by the access control device through the 802.1X authentication tunnel, and performs key negotiation with the client by using the pairwise master key to obtain a session key; or receives the session key transmitted by the access control device through the 802.1X authentication tunnel.

Figure 6:
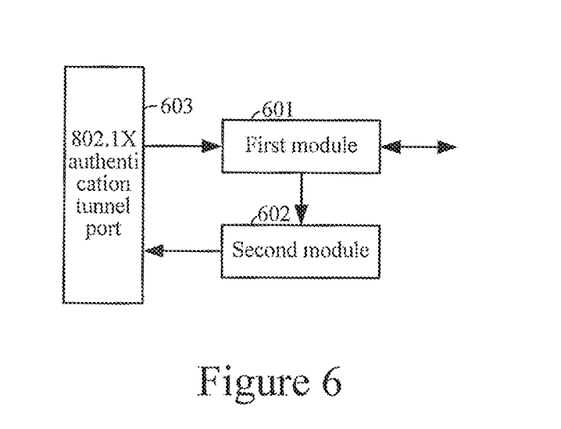
FIG. 6 is a structure diagram of an access control device according to one example.

FIG. 6 is a structure diagram of an access control device according to an example. As shown in FIG. 6, a 802.1X authentication tunnel is set up between the access device and the access control device, a 802.1X client template is enabled at the access device, and a 802.1X device template is enabled at a tunnel port of the access control device. The access control device includes a first module 601, a second module 602 and a 802.1X authentication tunnel port 603.

The first module 601 receives a tunnel packet transmitted by the access device through the 802.1X authentication tunnel via the 802.1X authentication tunnel port 603, and parses the tunnel packet, performs functions of a 802.1X device if the tunnel packet is an authentication packet, i.e. authenticates the client, and transmits a pairwise master key obtained during the authentication to the second module 602 when the client passes the authentication.

The second module 602 transmits the pairwise master key received from the first module 601 to the access device through the 802.1X authentication tunnel, so that the access device performs key negotiation with the client by using the pairwise master key; or directly performs key negotiation with the client via the access device through the 802.1X authentication tunnel by using the pairwise master key, and transmits a session key obtained by negotiation to the access device via the 802.1X authentication tunnel port 603.

In practical applications, the access control device may have a backup relation with at least one other access control device, and the access control device further includes a third module, configured to save information exchanged by the first and second modules with the access device into the other access control device.

Compared with the conventional art, the 802.1X authentication tunnel is set up between the access device and the access control device, the access device performs the functions of the 802.1X client, the access control device performs the functions of the 802.1X device to authenticate the client; after the client passes the authentication, the access control device issues the pairwise master key obtained during the authentication process to the access device through the 802.1X authentication tunnel, so that the access device can perform key negotiation with the client by using the pairwise master key; or the access control device directly performs key negotiation with the client via the access device through the 802.1X authentication tunnel by using the pairwise master key, and transmits a session key obtained by negotiation to the access device via the 802.1X authentication tunnel. According to examples of the present invention, the 802.1X authentication can be performed to the client by the authenticator in the network access control device via the layer-2 or layer-3 network, and a wireless user access under the WLAN security architecture is supported.

What is claimed is:

1. A method for 802.1X authentication, used in a network that comprises an access device and an access control device, wherein a Wireless Local Area Network (WLAN) security template is enabled at the access device, an 802.1X client template is enabled at the access device to perform functions of an 802.1X client, and an 802.1X device template is enabled at a tunnel port of the access control device to perform functions of an 802.1X device, the method comprising:

establishing, by the access control device, an 802.1X authentication tunnel with an access device, receiving, by the access control device, an 802.1X protocol packet transmitted by a client at the access control device through the 802.1X authentication tunnel;

authenticating, by the access control device, the client after receiving the packet; and assisting, by the access control device, the access device through the 802.1X authentication tunnel to obtain a session key, wherein the assisting, by the access control device, the access device through the 802.1X authentication tunnel to obtain the session key comprises: transmitting, by the access control device, a pairwise master key obtained from the authentication process to the access device through the 802.1X authentication tunnel, whereby the access device performs a key negotiation with the client by using the pairwise master key to obtain the session key; or performing, by the access control device, the key negotiation with the client via the access device through the 802.1X authentication tunnel by using the pairwise master key obtained from the authentication process, and transmitting the session key obtained from the key negotiation process to the access device through the 802.1X authentication tunnel.

2. The method of claim 1, wherein the 802.1X authentication tunnel is established after a Wireless Local Area Network (WLAN) security template is enabled at the access device, or when the access device receives an 802.1X authentication protocol packet for the first time from the client.

3. The method of claim 1, wherein:

the network comprises a backup access control device which establishes a backup 802.1X authentication tunnel with the access device and the 802.1X device template is enabled at the backup access control device; and the method further comprises synchronizing, by the access control device, information exchanged between the access control device and the access device to the backup access control device in real time, whereby the backup access control device replaces the access control device when the main 802.1X authentication tunnel is unavailable.

4. The method of claim 1, wherein the access device is one of an Access Controller (AC) and a FAT Access Point (AP).

5. The method of claim 1, wherein the access control device is one of a Broadband Access Server (BAS) and a Broadband Remote Access Server (BRAS).

6. A non-transitory computer readable storage medium encoded with executable instructions for execution by a processor of an access control device to:

establish, by the access control device, an 802.1X authentication tunnel with an access device, wherein a Wireless Local Area Network (WLAN) security template is enabled at the access device, an 802.1X client template is enabled at the access device to perform functions of an 802.1X client, and an 802.1X device template is enabled at a tunnel port of the access control device to perform functions of an 802.1X device;

receive, by the access control device, an 802.IX protocol packet transmitted by a client through the 802.1X authentication tunnel;

authenticate, by the access control device, the client after receiving the 802.1X protocol packet; and assist, by the access control device, the access device through the 802.1X authentication tunnel to obtain a session key, wherein the assisting, by the access control device, the access device through the 802.1X authentication tunnel to obtain the session key comprises: transmitting, by the access control device, a pairwise master key obtained from the authentication process to the access device through the 802.1X authentication tunnel, whereby the access device performs a key negotiation with the client by using the pairwise master key to obtain the session key; or performing, by the access control device, the key negotiation with the client via the access device through the 802.1X authentication tunnel by using the pairwise master key obtained from the authentication process, and transmitting/receiving the session key obtained from the key negotiation process to the access device through the 802.1X authentication tunnel.

7. A method for 802.1X authentication, used in a network that comprises an access device and an access control device, wherein a Wireless Local Area Network (WLAN) security template is enabled at the access device, an 802.1X client template is enabled at the access device to perform functions of an 802.1X client, and an 802.1X device template is enabled at a tunnel port of the access control device to perform functions of an 802.1X device, the method comprising:
   establishing, by the access device, an 802.IX authentication tunnel with the access control device;
   receiving, by the access device, an 802.IX protocol packet transmitted by a client, and transmitting the 802.1X protocol packet to the access control device through the 802.1X authentication tunnel, whereby the access control device authenticates the client according to the 802.1X protocol packet received from the access device; and
   obtaining, by the access device, a session key under assistance from the access control device through the 802.1X authentication tunnel, wherein the obtaining, by the access device, the session key under assistance from the access control device through the 802.1X authentication tunnel comprises:
   receiving, by the access device, a pairwise master key transmitted by the access control device through the 802.1X authentication tunnel, and performing a key negotiation with the client by using the pairwise master key to obtain the session key; or
   receiving, by the access device, the session key transmitted by the access control device through the 802.1X authentication tunnel.

8. The method of claim 7, wherein the 802.1X authentication tunnel is established after a Wireless Local Area Network (WLAN) security template is enabled at the access device, or when the access device receives an 802.1X authentication protocol packet for the first time from the client.

9. The method of claim 7, wherein the access device is one of an Access Controller (AC) and a FAT Access Point (AP).

10. A non-transitory computer readable storage medium encoded with executable instructions for execution by a processor of an access device to:
   establish, by the access device, an 802.1X authentication tunnel with the access control device, wherein a Wireless Local Area Network (WLAN) security template is enabled at the access device, an 802.1X client template is enabled at the access device to perform functions of an 802.1X client, and an 802.1X device template is enabled at a tunnel port of the access control device to perform functions of an 802.1X device;
   receive, by the access device, an 802.IX protocol packet transmitted by a client, and transmit the 802.1X protocol packet to the access control device through the 802.1X authentication tunnel, whereby the access control device authenticates the client according to the 802.1X protocol packet received from the access device; and
   obtain, by the access device, a session key under assistance from the access control device through the 802.1X authentication tunnel, wherein the obtaining, by the access device, the session key under assistance from the access control device through the 802.1X authentication tunnel comprises:
   receiving, by the access device, a pairwise master key transmitted by the access control device through the 802.1X authentication tunnel, and performing a key negotiation with the client by using the pairwise master key to obtain the session key; or
   receiving, by the access device, the session key transmitted by the access control device through the 802.1X authentication tunnel.

11. An access device, which has a Wireless Local Area Network (WLAN) security template enabled and is connected to an access control device through an 802.1X authentication tunnel, and wherein an 802.1X client template is enabled at the access device such that the access device performs functions of an 802.1X client and an 802.1X device template is enabled at a tunnel port of the access control device such that the access control device performs functions of an 802.1X device, the access device comprising a first module, a second module, and an 802.1X authentication tunnel port, wherein:
   the first module is configured to receive a packet transmitted by a client, and transmit the packet to the access control device via the 802.1X authentication tunnel port through the 802.1X authentication tunnel when the packet is determined as an 802.1X protocol packet, the access control device authenticating the client according to the packet received from the first module; and
   the second module is configured to obtain a session key under assistance from the access control device through the 802.1X authentication tunnel, wherein the second module is configured to:
   receive a pairwise master key transmitted by the access control device through the 802. IX authentication tunnel, and perform a key negotiation with the client by using the pairwise master key to obtain the session key; or
   receive the session key transmitted by the access control device through the 802.IX authentication tunnel.

12. The access device of claim 11, wherein the access device is one of an Access Controller (AC) and a FAT Access Point (AP).

13. The access device of claim 11, wherein the access device begins to establish the 802.1X authentication tunnel with the access control device when the access device receives an 802.1X authentication protocol packet for the first time from the client.

14. An access control device, which is connected with an access device through an 802.1X authentication tunnel, and wherein an 802.1X client template is enabled at the access device such that the access device performs functions of an 802.1X client and an 802.1X device template is enabled at a tunnel port of the access control device such that the access control device performs functions of an 802.1X device, the access control device comprising a first module, a second module, and an 802.1X authentication tunnel port, wherein:
   the first module is configured to receive an 802.1X protocol packet transmitted by a client from the access device through the 802.1X authentication tunnel via the 802.1X authentication tunnel port, authenticate the client according to the 802.1X protocol packet, and transmit a pairwise master key obtained during authentication to the second module when the client passes the authentication; and
   the second module is configured to assist the access device through the 802.1X authentication tunnel to obtain a session key, wherein the second module is configured to:
   transmit the pairwise master key transmitted by the first module to the access device through the 802.1X authentication tunnel, whereby the access device can perform a key negotiation with the client by using the pairwise master key to obtain the session key; or directly perform the key negotiation with the client via the access device through the 802.1X authentication tunnel by using the pairwise master key, and transmit the session key obtained by the key negotiation to the access device through the 802.1X authentication tunnel.

15. The access control device of claim 14, wherein the access control device is one of a Broadband Access Server (BAS) and a Broadband Remote Access Server (BRAS).

16. The access control device of claim 14, further comprising a third module configured to save information exchanged by the first module and second module with the access device into another access control device having a backup relation with the access control device.

\* \* \* \* \*